US006875057B2

(12) United States Patent
Miyazawa et al.

(10) Patent No.: US 6,875,057 B2
(45) Date of Patent: Apr. 5, 2005

(54) CARD CONNECTOR WITH A MECHANISM PREVENTING ERRONEOUS INSERTION OF A CARD (75) Inventors: Junichi Miyazawa, Yokohama (JP); Shigeru Akiyama, Machida (JP)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/482,757
(22) PCT Filed: Jun. 26, 2002
(86) PCT No.: PCT/US02/20225
§ 371 (c)(1),
(2), (4) Date: Aug. 3, 2004
(87) PCT Pub. No.: WO03/003294
PCT Pub. Date: Jan. 9, 2003

(65) Prior Publication Data
US 2004/0248474 A1 Dec. 9, 2004

(30) Foreign Application Priority Data
Jun. 29, 2001 (JP) .......................... 2001-199347

(51) Int. Cl.[7] .............................................. H01R 24/00
(52) U.S. Cl. .......................... 439/630; 439/946; 235/441
(58) Field of Search .................................. 439/630, 633, 439/44, 946; 235/441

(56) References Cited

U.S. PATENT DOCUMENTS 4,780,603 A * 10/1988 Hamada ...................... 235/492
6,068,516 A * 5/2000 Chang ........................ 439/633

* cited by examiner

Primary Examiner—Hae Moon Hyeon
(74) Attorney, Agent, or Firm—Stacey E. Caldwell (57) ABSTRACT A memory card connector includes a housing (12) mounting a plurality of terminals (18) having contact portions for engaging contacts on one side of a memory card. A cover (14) is mounted on the housing (12) and defines a card-receiving cavity (16) therebetween for receiving the card in a given, normal orientation. A displacement portion (22) of the housing displaces the memory card toward the cover if the memory card is inserted into the cavity in an abnormal orientation. A stop (44) on the cover engages an edge of the memory card to prevent the card from reaching the contact portions of the terminals if the memory card is inserted into the cavity in the abnormal orientation.

16 Claims, 7 Drawing Sheets

CARD CONNECTOR WITH A MECHANISM PREVENTING ERRONEOUS INSERTION OF A CARD

FIELD OF THE INVENTION

This invention generally relates to the art of electrical connectors and, particularly, to a memory card connector. The invention is specifically directed to a system for protecting the terminals of the card connector in the event of incorrect or abnormal insertion of the memory card into the connector.

BACKGROUND OF THE INVENTION

Memory cards are known in the art and contain intelligence in the form of a memory circuit or other electronic program. Some form of card reader reads the information or memory stored on the card. Such cards are used in many applications in today's electronic society, including video cameras, smartphones, music players, ATMs, cable television decoders, toys, games, PC adapters and other electronic applications. Typically, a memory card includes a contact or terminal array for connection through a card connector to a card reader system and then to external equipment. The connector readily accommodates insertion and removal of the card to provide quick access to the information and program on the card. The card connector includes terminals for yieldingly engaging the contact array of the memory card. Ejecting devices often are provided for facilitating inserting and ejecting the memory card to and from the card connector.

Card connectors of this type are disclosed in Japanese Utility Model Application Laid-Open No. Hei. 1-75983, Japanese Utility Model Application Laid-Open No. Hei. 1-150387 and Japanese Patent Application Laid-Open No. Hei. 11-135192.

One of the problems with such memory card connectors involves protecting the terminals of a connector in the event that a memory card is inserted in an incorrect or abnormal orientation. In other words, the contact or terminal array on the memory card typically is located along a front or leading edge of the card and on one side of the card, such as the bottom side of the card. The contacts may be located in recessed areas along the bottom front edge of the card. Of course, a correct or normal orientation of an inserted card has the contacts at the front bottom edge of the card. If the card is reversed in a backward or abnormal orientation, and the rear end of the card is inserted into the card connector, the terminals may be damaged or buckled because the rear end of the card is not provided with terminal recesses. Stop means may be provided on the connector housing to prevent such abnormal insertion of the memory card, but such stop means often can be overridden with excessive insertion forces. The present invention is direction to solving these problems with a new and improved terminal protection system in such card connectors.

SUMMARY OF THE INVENTION

An object, therefore, of the invention is to provide a new and improved memory card connector with an improved terminal protection system.

In the exemplary embodiment of the invention, the memory card connector includes a housing mounting a plurality of terminals having contact portions for engaging contacts on one side of a memory card. A cover is mounted on the housing and defines a card-receiving cavity therebetween for receiving the card in a given, normal orientation. Displacement means are provided on the housing for displacing the memory card toward the cover if the memory card is inserted into the cavity in an abnormal orientation. Stop means are provided on the cover for engaging an edge of the memory card to prevent the card from reaching the contact portions of the terminals if the memory card is inserted into the cavity in the abnormal orientation.

As disclosed herein, the displacement means is provided by at least one rib on the housing in the path of insertion of the memory card into the cavity. The rib has an abutment surface for engaging the edge of the memory card.

According to one aspect of the invention, the cover is fabricated of metal material and includes a thin plate portion defining a top wall of the cavity against which the memory card is displaced. The thin plate portion of the cover is yieldable away from the contact portions of the terminals as the memory card is displaced thereagainst. The thin plate portion includes an opening, and the stop means is provided by a rear edge of the opening.

According to another aspect of the invention, a second displacement means is provided on the housing for displacing the memory card toward the cover and away from the contact portions of the terminals if the memory card is inserted into the cavity in the abnormal orientation. The second displacement means is located down-line from the stop means in an insertion direction of the memory card to provide redundant protection for the contact portions of the terminals. The second displacement means is provided by at least one rib on the housing in the path of insertion of the memory card into the cavity. The rib has an angled cam surface for biasing the memory card away from the contact portions of the terminals.

The first displacement means also or alternatively comprises a given cross-sectional configuration of the card-receiving cavity which matches a cross-sectional configuration of the memory card and which allows for ready insertion of the memory card into the cavity in the given, normal orientation of the card. If the card is inserted into the cavity in the abnormal orientation, the cross-sectional configuration of the cavity biases the memory card toward the cover and into engagement with the stop means on the cover.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Referring to the drawings in greater detail, and first to FIGS. 1–4, a first embodiment of a memory card connector is generally designated 10 and includes a housing, generally designated 12, and a cover, generally designated 14, which combine to define a card-receiving cavity 16 therebetween. The housing may be molded of dielectric material such as plastic or the like. The cover may be stamped and formed of sheet metal material or the like. The connector includes an ejection device EJ for ejecting a memory card inserted into cavity 16.

Figure 4:
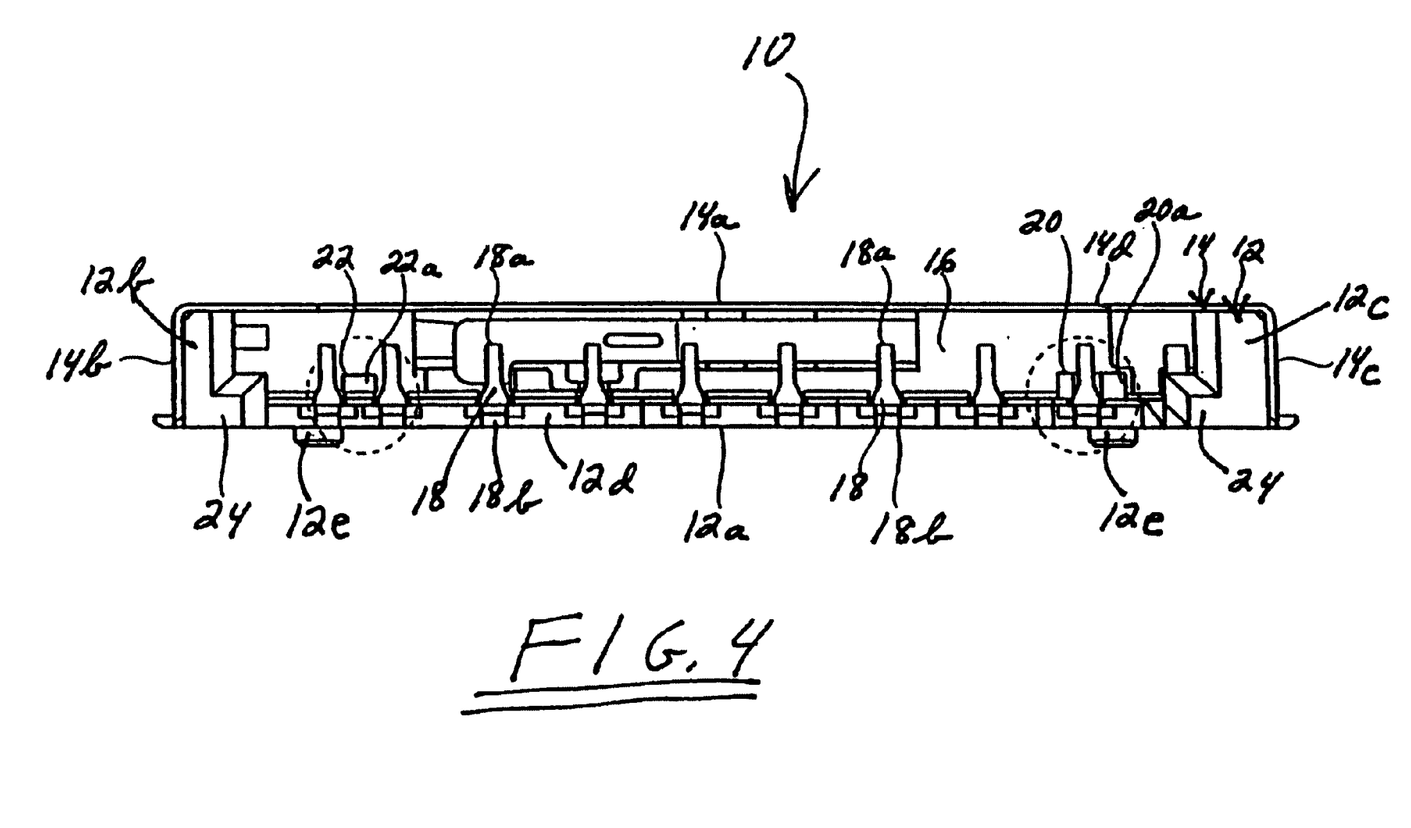
FIG. 4 is an enlarged elevational view of the connector looking at the front or insertion end of the connector.

As best seen in FIG. 4, housing 12 includes a bottom plate portion 12a, left and right side wall portions 12b and 12c, respectively, and a terminal mounting portion 12d. The housing has a plurality of mounting posts 12e (FIG. 4) for mounting connector 10 on a printed circuit board.

Cover 14 includes a thin, upper plate portion 14a and left and right side wall portions 14b and 14c, respectively, overlying the left and right side wall portions 12b and 12c, respectively, of the housing. The upper plate portion, therefore, is yieldable or flexible, for purposes described hereinafter. An opening 14d is formed in upper plate portion 14a.

Figure 1:
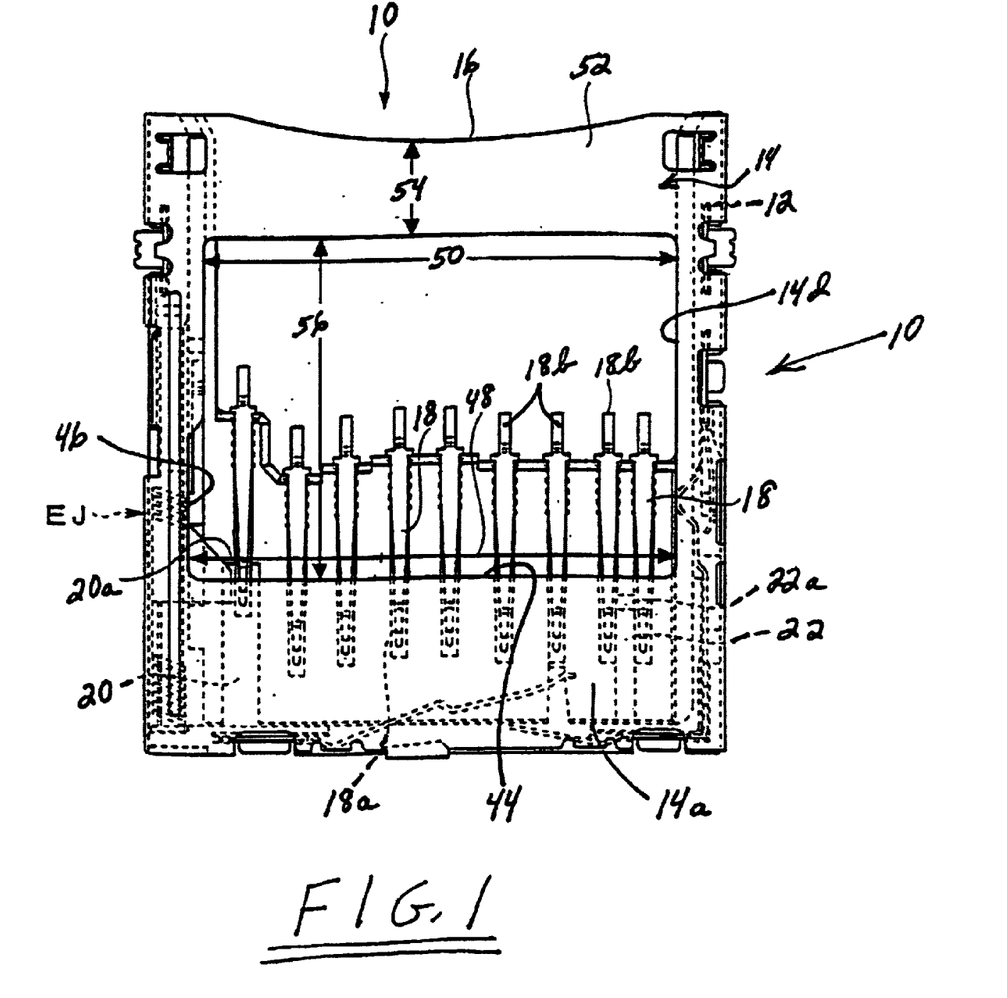
FIG. 1 is a top plan view of a first embodiment of a memory card connector according to the invention.
Figure 2:
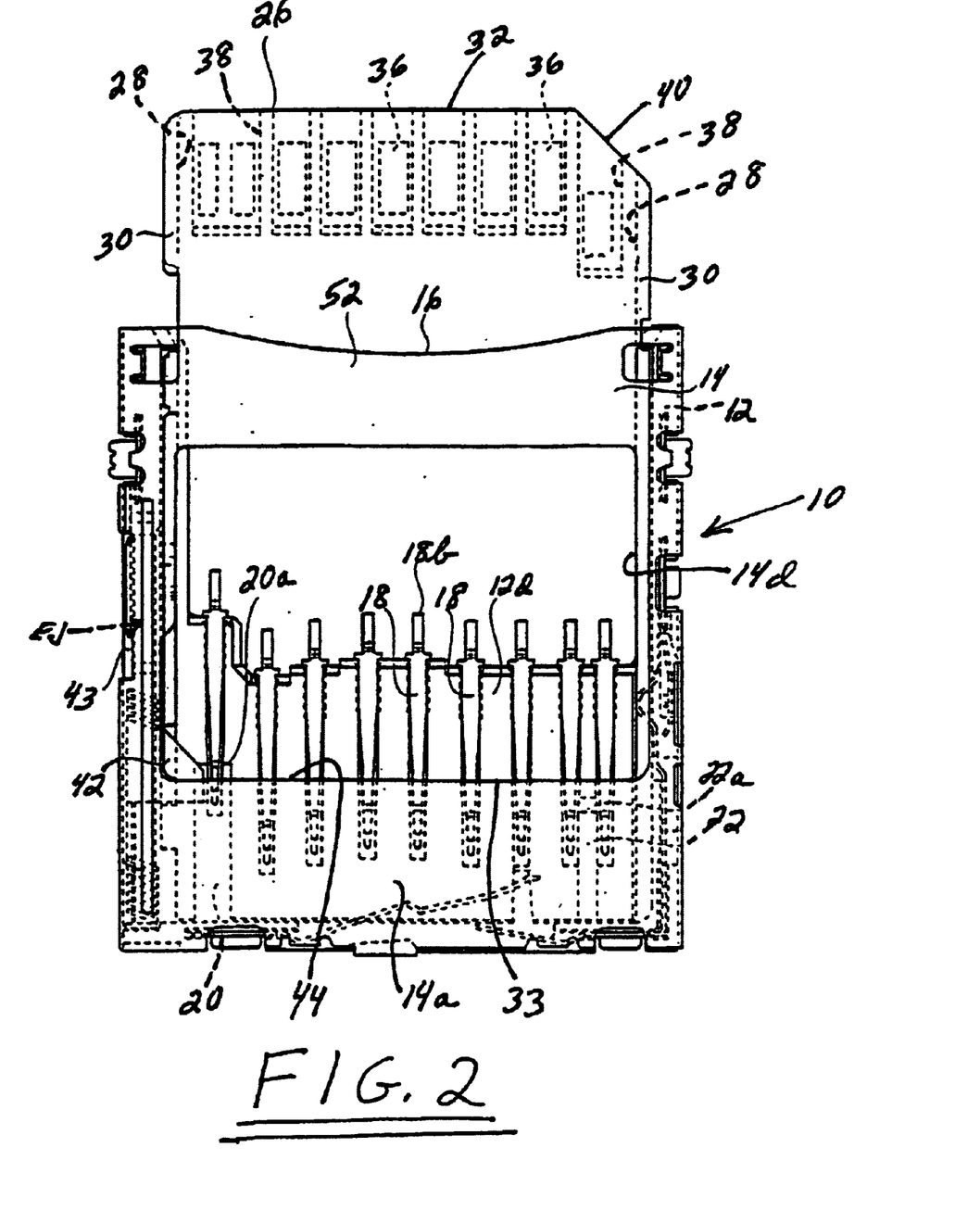
FIG. 2 is a view similar to that of FIG. 1, showing a memory card inserted in the connector in an abnormal orientation.
Figure 3:
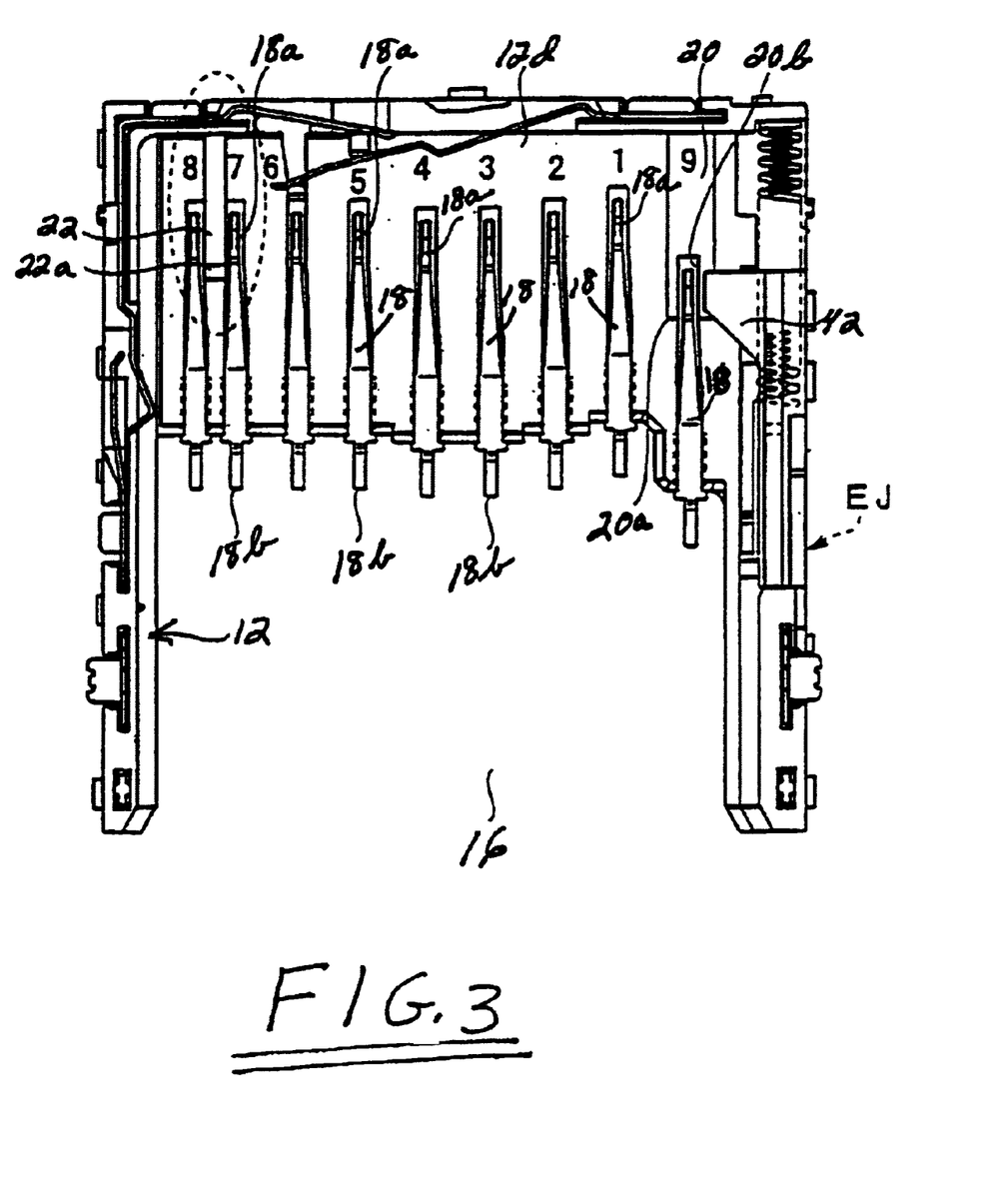
FIG. 3 is a top plan view of the housing and terminals of the connector.

A plurality of terminals 18 are mounted in mounting portion 12d of housing 12 and are spaced transversely of the insertion direction of the memory card as seen in FIGS. 1–3. The terminals have contact portions 18a which project upwardly from mounting portion 12d of the housing and into cavity 16 for engaging the contacts of the memory card as described hereinafter. The terminals have tail portions 18b for surface connection, as by soldering, to appropriate circuit traces on the printed circuit board. As seen in FIG. 4, the tail portions are generally flush with the bottom of the connector and away from card-receiving cavity 16.

Generally, first displacement means are provided on housing 12 for engaging and displacing a memory card before the card engages contact portions 18a of terminals 18, in the event that the card is inserted into cavity 16 in an abnormal orientation described hereinafter. Specifically, the first displacement means is provided by a stop rib 20 having an abrupt stop surface 20a in the path of insertion of the memory card into the cavity for stopping the memory card if the card is inserted in an abnormal orientation. The rib has a groove 20b for receiving the contact portion of one of the terminals.

Generally, second displacement means are provided on housing 12 for displacing the memory card toward upper plate portion 14a of cover 14 and away from contact portions 18a of terminals 18 if the memory card is inserted into the cavity in an abnormal orientation described hereinafter. Specifically, the second displacement means is provided by a cam rib 22 having an angled cam surface 22a in the path of insertion of the memory card if the card is inserted into the cavity in the abnormal orientation. Angled cam surface 22a is effective to displace or bias the abnormally oriented memory card upwardly toward upper plate portion 14a of the cover and away from contact portions 18a of terminals 18. As stated above, upper plate portion 14a of the cover is flexible or yieldable and, thereby, can move upwardly as the abnormally oriented memory card is biased or displaced thereagainst.

Figure 5:
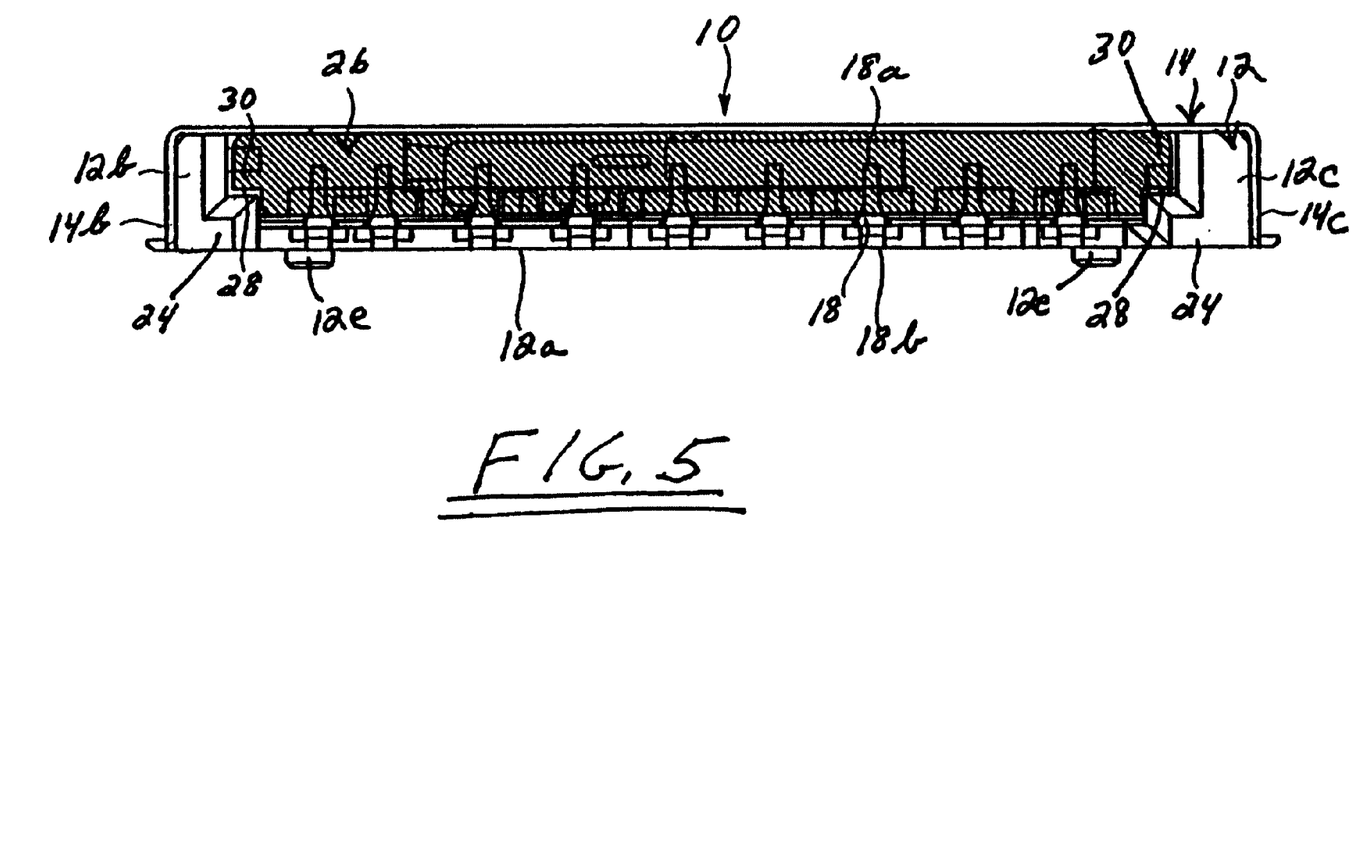
FIG. 5 is a view similar to that of FIG. 4, with a memory card being inserted into the connector and being shown as shaded in FIG. 5.

Referring to FIG. 5 in conjunction with FIG. 4, it can be seen that left and right side wall portions 12b and 12c, respectively, of housing 12 are generally L-shaped to define a bottom, inwardly directed flange 24. A memory card, generally designated 26, is shown shaded in FIG. 5. The side edges of the memory card are stepped, as at 28, to define upper side ribs 30. This stepped configuration of the side edges of the memory card match the configurations of L-shaped side walls 12b and 12c of the housing, so that the memory card has a top-to-bottom normal orientation when the memory card is normally inserted into cavity 16 of the connector. In essence, card-receiving cavity 16 has a given cross-sectional configuration which matches the cross-sectional configuration of memory card 26 to allow for ready insertion of the memory card into the cavity in a given normal orientation of the card in a vertical or top-to-bottom orientation as shown in FIG. 5.

Referring back to FIG. 2, memory card 26 has a front or leading end or edge 32 when the memory card is inserted into cavity 16 of connector 10 in its normal orientation, along with a rear end or edge 33. It should be noted that memory card 26 is shown in FIG. 2 in a reverse or abnormal orientation with the rear end or edge 33 of the card having been incorrectly or erroneously inserted into the connector. In any event, memory card 26 has a plurality of contacts 36 on the bottom or underside of the card for engaging contact portions 18a of terminals 18 of the card connector. The terminals are disposed within recesses 38 in the bottom of the card, the recesses opening at front edge 32 of the card. In order to fully understand the invention, it should be understood that the normally rear edge of the card has no recesses and, in essence, forms a solid wall across the rear of the memory card.

In operation, when memory card 26 is inserted into card-receiving cavity 16 of card connector 10 in its given, normal orientation, front or leading edge 32 of the card is inserted first into the connector. When fully inserted, contacts 36 on the underside of the card will engage contact portions 18a of terminals 18. Ribs 20 and 22 will not interfere with insertion of the memory card in this normal orientation because they will move into recesses 38. The memory card has an angled corner 40 (FIG. 2) for engaging an angled abutment portion 42 of a slider 43 of ejection device EJ.

However, if memory card 26 is turned-around backwards in an abnormal orientation as shown in FIG. 2, whereby an attempt is made to insert the rear edge 33 of the card into cavity 16 and toward the contact portions of terminals 18, the solid wall defined by the rear edge of the card will cause interference with portions of the connector. First, the solid wall defined by the rear edge of the card will abut stop surface 20a of rib 20. If considerable or excessive forces still are applied to the card in the insertion direction to overcome the resistance of stop surface 20a of rib 20, the rib will bias the card upwardly against the top of the cover and into engagement with a back stop edge 44 of opening 14d in the top plate of the cover. In essence, back stop edge 44 of the opening defines a stop means on the cover for engaging the rear edge of the memory card to prevent the card from reaching contact portions 18a of terminals 18 if the memory card is inserted into cavity 16 in the backward or abnormal orientation of the card shown in FIG. 2.

Generally, redundant protection is provided for the contact portions of the terminals should the rear edge, for some reason or another, move past the stop means provided by back edge 44 of opening 14*d* of the cover. Specifically, the solid rear edge of the card will engage cam surface 22*a* of cam rib 22. The cam surface is located down-line from the stop means provided by back edge 44 of the opening. The angled cam surface of the cam rib will bias or displace the memory card upwardly toward upper plate portion 14*a* of cover 14 and away from contact portions 14*a* of terminals 18. Being flexible, the upper plate portion of the cover can yield to allow the solid rear edge of the memory card to ride onto the top of rib 22, whereby the memory card cannot damage contact portions 18*a* of the terminals. Therefore, cam rib 22 provides redundant protection for the contact portions of the terminals should the memory card move past and not engage the stop means provided by back edge 44 of opening 14*d* in the cover.

Referring to FIG. 1, opening 14*d* in the cover is widened, as at 46, whereby the length 48 of back stop edge 44 of the opening is longer than the length 50 of the front edge of the opening. This configuration further enhances rear edge 33 (FIG. 2) of the memory card engaging back stop edge 44 of the cover opening. The opening leaves a front strip portion 52 of the cover top plate. The width 54 of this strip portion is narrower than the width 56 of opening 14*d* in the insertion direction of the card. The strip portion allows the upper plate of the cover to be more easily bent or biased upwardly, and the wider dimension 56 of the opening causes rear edge 33 of the memory card to more easily abut against back stop edge 44 of the opening.

Finally, and again referring to FIG. 5, if memory card 26 is turned upside-down so that it's cross-sectional configuration does not match the cross-sectional configuration of cavity 16, as described above in relation to FIG. 5, attempts still may be made to force the card into the cavity. Therefore, this matching cross-sectional configuration of the card and the cavity is effective to provide still another displacement means to bias the card upwardly against the thin upper plate portion of the cover. Actually, the card would be biased upwardly against strip portion 52 (FIGS. 1 and 2) of the cover. Since strip portion 52 is flexible, the card will move upwardly thereagainst. Eventually, this abnormally inserted card will be stopped by the stop means afforded by back stop edge 44 of opening 14*d*, whereby the abnormally inserted memory card will not eventually engage and damage contact portions 18*a* of terminals 18.

Figure 6:
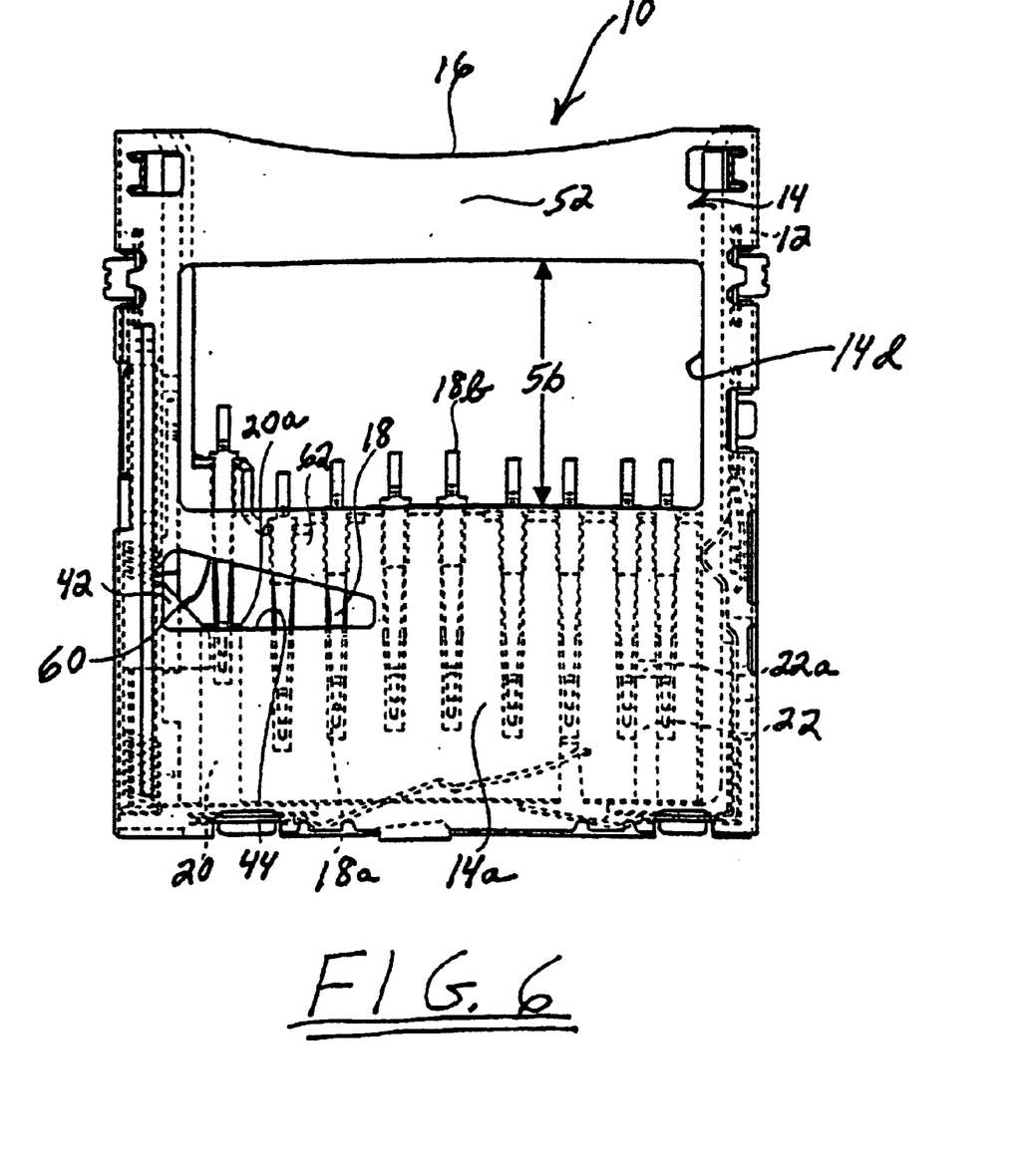
FIG. 6 is a top plan view of a second embodiment of a memory card connector according to the invention.
Figure 7:
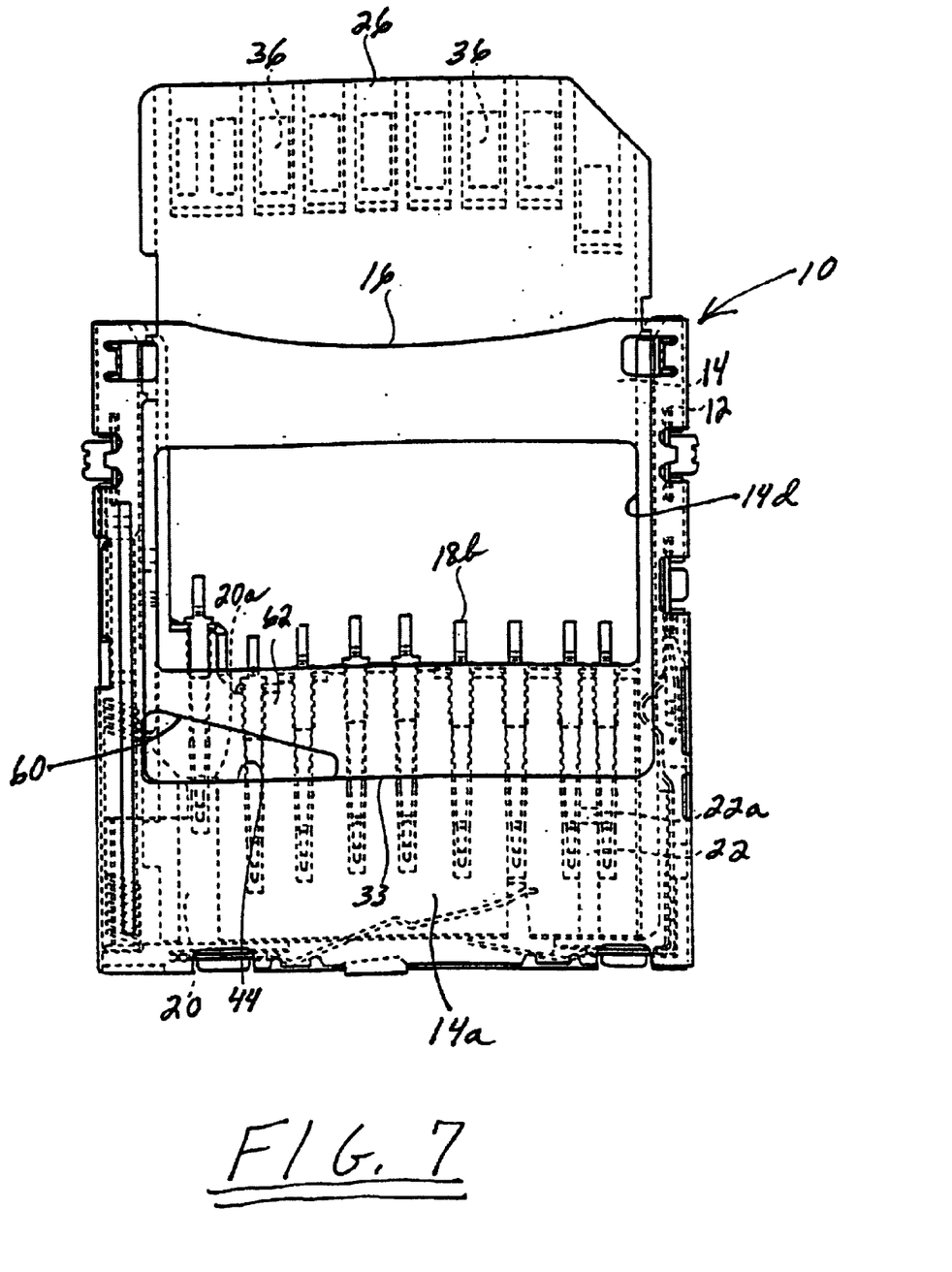
FIG. 7 is a view similar to that of FIG. 6, with a memory card being inserted into the connector in an abnormal orientation.

FIGS. 6 and 7 show a second embodiment of a memory card, generally designated 10, which is substantially similar to the first embodiment in FIGS. 1–5. Housing 12 of the second embodiment is substantially identical to the housing of the first embodiment, and cover 14 of the second embodiment is substantially similar to the cover of the first embodiment. Therefore, like reference numerals have been applied in FIGS. 6 and 7 corresponding to like components described above in relation to the first embodiment of FIGS. 1–5. In addition, a description of those like components will not be repeated for the second embodiment.

More particularly, opening 14*d* in the thin upper plate portion 14*a* of the cover in the second embodiment is smaller than the opening in the first embodiment. In other words, the front-to-rear dimension 56 of the opening in the second embodiment is smaller than the same dimension of the opening in the first embodiment.

However, a smaller second opening 60 is formed in upper plate portion 14*a* of the second embodiment. Opening 60 is generally triangularly shaped but forms a back stop edge 44 similar to the back stop edge 44 of opening 14*b* of the first embodiment. A portion 62 of the thin upper plate 14*a* is disposed between second opening 60 and first opening 14*d*. This portion 62 is easily bent or displaced. In operation, rear edge 33 (FIG. 7) of memory card 26 engages back stop edge 44 as seen in FIG. 7 if the card is inserted in an abnormal orientation, just as in the first embodiment. The reason for providing the second, smaller opening 60 in the second embodiment is to provide a greater surface area of upper plate portion 14*a* of the cover for applying a suction component, electromagnet, or the like, during manufacture and assembly of the connector.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A memory card connector (10), comprising:
   a housing (12) mounting a plurality of terminals (18) having contact portions (18*a*) for engaging contacts on one side of a memory card (26);
   a cover (14) mounted on the housing (12) and defining a card-receiving cavity (16) therebetween for receiving the card (26) in a given, normal orientation;
   displacement means on the housing (12) for displacing the memory card (26) toward the cover (14) if the memory card (26) is inserted into the cavity (16) in an abnormal orientation; and
   stop means on the cover (14) for engaging an edge of the memory card (26) to prevent the card (26) from reaching the contact portions (18*a*) of the terminals (18) if the memory card (26) is inserted into the cavity (16) in said abnormal orientation.

2. The memory card connector (10) of claim 1 wherein said displacement means comprises at least one rib (20) on the housing (12) in the path of insertion of the memory card (26) into the cavity (16).

3. The memory card connector (10) of claim 2 wherein said rib (20) has an abutment surface (20*a*) for engaging the edge of the memory card (26).

4. The memory card connector (10) of claim 1 wherein said cover (14) includes a thin plate portion (14*a*) defining a top wall of said cavity (16) against which the memory card (26) is displaced.

5. The memory card connector (10) of claim 4 wherein said cover (14) is fabricated of metal material, and the thin plate portion (14*a*) of the cover (14) is yieldable away from the contact portions (18*a*) of the terminals (18) as the memory card (26) is displaced thereagainst.

6. The memory card connector (10) of claim 5 wherein the thin plate portion (14*a*) of said cover (14) includes an opening (14*d*), and said stop means comprises a rear edge (44) of the opening (14*d*).

7. The memory card connector (10) of claim 1 wherein said cover (14) includes a flexible top wall (14*a*) defining a top of said cavity (16) against which the memory card (26) is displaced, the flexible top wall (14*a*) including an opening (14*d*), and said stop means comprises a rear edge (44) of the opening (14*d*).

8. The memory card connector (10) of claim 1, including a second displacement means on the housing (12) for displacing the memory card (26) toward the cover (14) and away from the contact portions (18*a*) of the terminals (18) if the memory card (26) is inserted into the cavity (16) in said abnormal orientation, the second displacement means being located down-line from said stop means in an insertion direction of the memory card (26) to provide redundant protection for the contact portions (18a) of the terminals (18).

9. The memory card connector (10) of claim 8 wherein said second displacement means comprises at least one rib (22) on the housing (12) in the path of insertion of the memory card (26) into the cavity (16).

10. The memory card connector (10) of claim 9 wherein said rib (22) has an angled cam surface (22a) for biasing the memory card (26) away from the contact portions (18a) of the terminals (18).

11. The memory card connector (10) of claim 1 wherein said displacement means comprises a given cross-sectional configuration of the card-receiving cavity (16) which matches a cross-sectional configuration of the memory card (26) and which allows for ready insertion of the memory card (26) into the cavity (16) in said given, normal orientation of the card (26), the cross-sectional configuration of the cavity (16) biasing the memory card (26) toward the cover (14) and into engagement with the stop means on the cover (14) if the card (26) is inserted into the cavity (16) in said abnormal orientation.

12. A memory card connector (10), comprising:
  a housing (12) mounting a plurality of terminals (18) having contact portions (18a) for engaging contacts on one side of a memory card (26);
  a cover (14) mounted on the housing (12) and defining a card-receiving cavity (16) therebetween for receiving the card (26) in a given, normal orientation, the cover (14) including a thin plate portion (14a) defining a top wall of said cavity (16), the thin plate portion (14a) including an opening (14d);
  displacement means in the form of a rib (20) on the housing (12) in the path of insertion of the memory card (26) into the cavity (16) for displacing the memory card (26) toward the plate portion (14a) of the cover (14) if the memory card (26) is inserted into the cavity (16) in an abnormal orientation; and
  stop means in the form of a rear stop edge (44) of said opening (14d) for engaging an edge of the memory card (26) to prevent the card (26) from reaching the contact portions (18a) of the terminals (18) if the memory card (26) is inserted into the cavity (16) in said abnormal orientation.

13. The memory card connector (10) of claim 12 wherein said rib (20) has an abutment surface (20a) for engaging the edge of the memory card (26).

14. The memory card connector (10) of claim 12 wherein said cover (14) is fabricated of metal material, and the thin plate portion (14a) of the cover (14) is yieldable away from the contact portions (18a) of the terminals (18) as the memory card (26) is displaced thereagainst.

15. The memory card connector (10) of claim 12, including a cam rib (22) on the housing (12) for displacing the memory card (26) toward the cover (14) and away from the contact portions (18a) of the terminals (18) if the memory card (26) is inserted into the cavity (16) in said abnormal orientation, the cam rib (22) being located down-line from said stop means in an insertion direction of the memory card (26) to provide redundant protection for the contact portions (18a) of the terminals (18).

16. The memory card connector (10) of claim 15 wherein said cam rib (22) has an angled cam surface (22a) for biasing the memory card (26) away from the contact portions (18a) of the terminals (18).

* * * * *